United States Patent [19]

Phillips

[11] 4,307,512

[45] Dec. 29, 1981

[54] ROTARY WAND WITH ATTACHED CIRCULAR SAW BLADE

[76] Inventor: Herbert H. Phillips, 1010 E. North Bay St., Tampa, Fla. 33603

[21] Appl. No.: 179,637

[22] Filed: Aug. 20, 1980

[51] Int. Cl.³ .............................................. B23D 21/06
[52] U.S. Cl. ........................................ 30/94; 30/102; 30/103
[58] Field of Search ..................... 30/93, 94, 102, 103, 30/104, 105, 106, 107, 108

[56] References Cited

U.S. PATENT DOCUMENTS

| | | | |
|---|---|---|---|
| 672,312 | 4/1901 | Cook | 30/106 |
| 783,490 | 2/1905 | Wernicke | 30/107 |
| 802,215 | 10/1905 | Johnson | 30/104 |
| 860,052 | 7/1907 | McCormick | 30/104 |
| 1,835,651 | 12/1931 | Ihsen | 30/106 |
| 1,902,355 | 3/1933 | Day et al. | 30/103 |
| 3,883,950 | 5/1975 | Kurtz | 30/103 |
| 3,911,574 | 10/1975 | Jones | 30/103 |

FOREIGN PATENT DOCUMENTS 1773 of 1888 United Kingdom .................. 30/104

Primary Examiner—Stephen G. Kunin
Assistant Examiner—J. T. Zatarga
Attorney, Agent, or Firm—Harvey B. Jacobson

[57] ABSTRACT

An elongated shank section is provided including mounting structure on one end of the shank section for removably mounting a rotary saw blade thereon. Coupling structure is provided on the other end of the shank section for removably coupling a source of rotary input torque to the shank section and a rotary abutment collar assembly is mounted on an intermediate portion of the shank section for rotation of the shank section relative thereto and including structure for adjustably positioning the abutment collar assembly along the shank section and releasably retaining the collar assembly in adjusted position along the shaft section against axial displacement relative thereto. An elongated handle is provided and one end of the handle defines a hand grip while the other end of the handle includes a transverse journal portion through which the shank section is rotatably received. The handle journal portion is mounted on the shank section intermediate the abutment collar assembly and the coupling structure.

3 Claims, 6 Drawing Figures

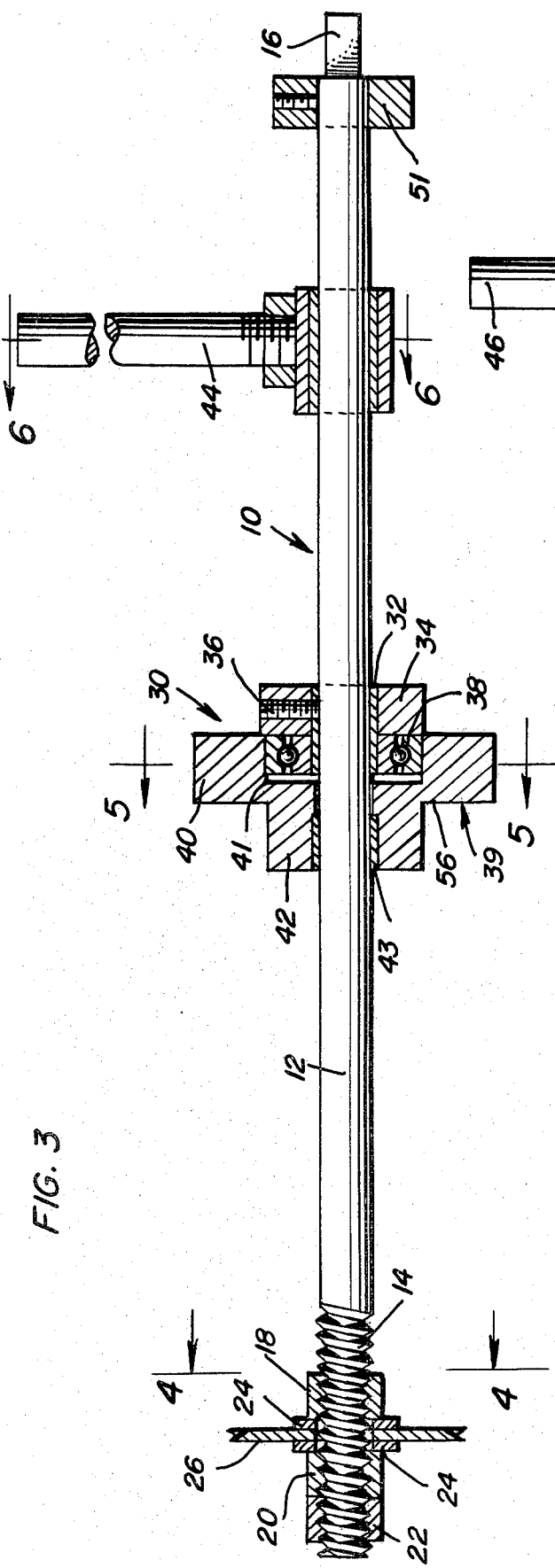
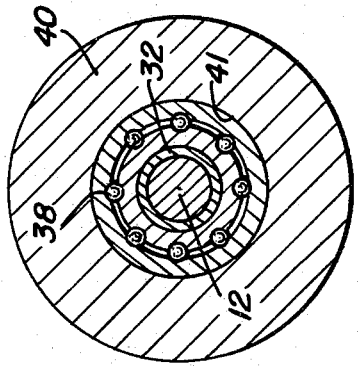
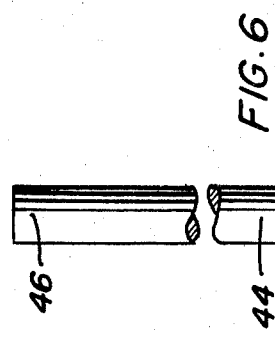
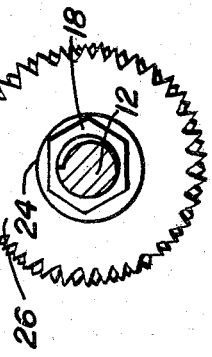

ROTARY WAND WITH ATTACHED CIRCULAR SAW BLADE

BACKGROUND OF THE INVENTION

In many instances, it is desirable to cut pipe or tube sections in situations wherein conventional pipe or tubing cutters may not be used. Specifically, there are many instances wherein it is desirable to cut pipe sections from within the latter due to an absence of more than minimal clearance about the outside of the pipe or tube section in the area thereof in which the desired cut is to be made. Accordingly, a need exists for a tool whereby pipe sections may be internally cut.

Examples of previously known structures including some of the general structural and operational features of the instant invention are disclosed in U.S. Pat. Nos. 2,812,791, 3,336,611, 3,664,756, 3,865,502, 3,870,431, 3,965,510 and 4,076,444.

BRIEF DESCRIPTION OF THE INVENTION

The tool of the instant invention comprises an elongated shank having structure on one end for removably mounting a circular saw blade thereon and coupling structure on the other end by which a source of rotary input torque may be coupled to the shank. An abutment collar assembly is rotatably mounted on an intermediate portion of the shank and is adjustable therealong as desired. Also, an elongated handle defining a hand grip on one end is provided and including a transverse journal on the other end through which the shank is rotatably journaled. The journal is disposed on the shank between the abutment collar and the coupling structure.

The main object of this invention is to provide a tool whereby tubular pipes and other tubular sections may be readily cut from the inside thereof.

Yet another object of this invention is to provide a tool in accordance with the preceding object and which may also be utilized to cut tube and pipe sections from the exteriors thereof.

Yet another object of this invention is to provide an interior pipe section cutting tool including structure by which the position of a cut to be made thereby may be accurately spaced from one end of the pipe section to be cut.

A further object of this invention is to provide a tool for interior cutting of pipe sections and the like and which may be powered through the utilization of various different forms of rotary torque producing hand tools.

A final object of this invention to be specifically enumerated herein is to provide a pipe cutting tool in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an enlarged longitudinal vertical sectional view of the pipe cutting tool;

FIG. 4 is a transverse sectional view taken substantially upon the place indicated by the section line 4—4 of FIG. 3;

FIG. 5 is a transverse sectional view taken substantially upon the plane indicated by the section line 5—5 of FIG. 3; and FIG. 6 is a transverse sectional view taken substantially upon the plane indicated by the section line 6—6 of FIG. 3.

DETAILED DESCRIPTION OF THE INVENTION

Figure 1:
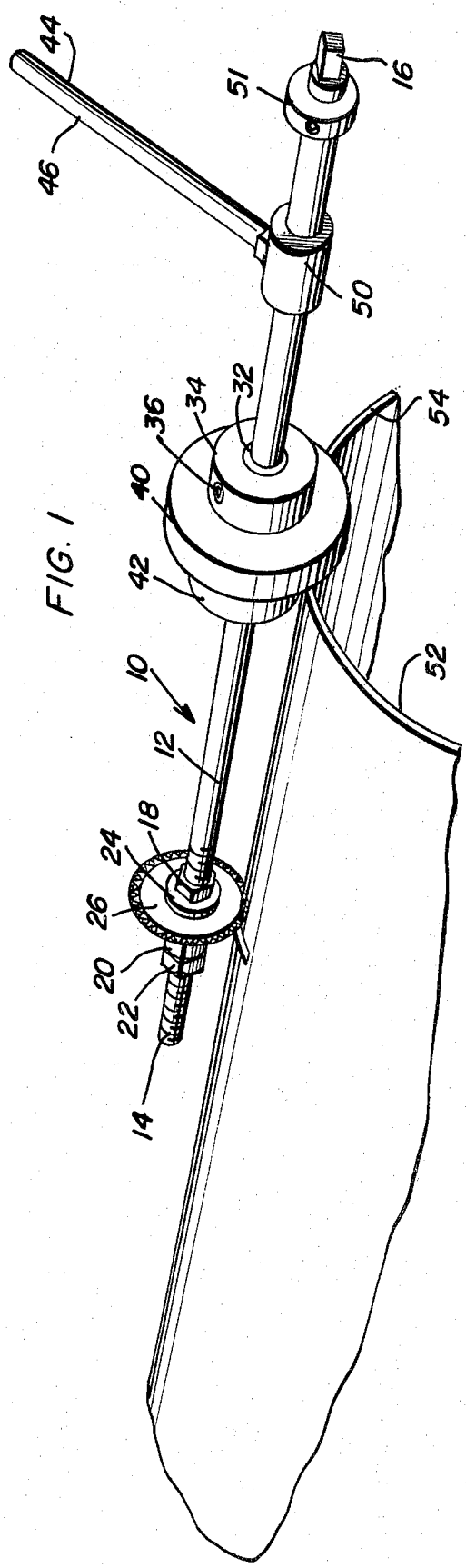
FIG. 1 is a fragmentary perspective view of a pipe section with the tool of the instant invention shown in use cutting the pipe section a predetermined distance from one end thereof and from the exterior of the pipe section.

Referring now more specifically to the drawings, the numeral 10 generally designates the pipe cutting tool of the instant invention. The tool 10 includes an elongated shank section 12 which is externally threaded at one end as at 14 and includes rotary input torque coupling structure 16 at the other end. The externally threaded end 14 includes three threaded nuts 18, 20 and 22 threaded thereon and a pair of thrust washers 24 are disposed on the threaded portion of the shank section 12 between the nuts 18 and 20. The central apertured portion of a rotary saw blade 26 is disposed on the threaded end of the shank section 12 between the washers 24 and the nuts 18 and 20 are utilized to bias the washers 24 into tight clamping engagement with the saw blade 26 in order to mount the latter on the shank section 12 for rotation therewith. The nut 22 acts as a jam nut and is tightened against the nut 20 in order to insure that the nut 20 will not rotate relative to the shank section 12.

The intermediate portion of the shank section 12 has a rotary abutment collar assembly referred to in general by the reference numeral 30 mounted thereon. The abutment collar assembly 30 includes a bearing sleeve 32 slidable on the shank section 12 and having a setscrew equipped collar 34 mounted on one end by a press fit with a setscrew 36 being operable to secure the sleeve 32 and collar adjustably on the shank section 12. The end of the bearing sleeve 32 remote from the collar 34 has a ball bearing assembly 38 permanently mounted thereon by press fitting. A rotatable member 39 in the form of a cylindrical member 40 is supported and journaled by bearing assembly 38 press fitted into a recess 41 which has an inner end spaced from the end of sleeve 32 and bearing assembly 38 as illustrated in FIG. 3. Unitary with member 40 is a smaller cylindrical member 42 in the form of a roller. The end of member 42 remote from the sleeve 32 is provided with a press fitted bushing or sleeve bearing 43 which journals the cylindrical member 40 and roller 42 on the shank section 12. Further, the member 42 is also smaller in diameter than the saw blade 26, see FIG. 3.

An elongated handle 44 is provided and includes a first end 46 defining a hand grip and a second externally threaded end 48 having a transverse journal 50 removably supported therefrom. The journal 50 rotatably and slidably receives the shank section 12 therethrough. A setscrew equipped collar 51 is provided on shank section 12 to prevent the handle from sliding off the shank section 12.

In operation, when it is desired to cut a pipe section such as the pipe section 52 of FIG. 1 from the exterior thereof, the distance of the desired cut zone from one end 54 of the pipe section 52 is determined and the abutment collar assembly 39 is shifted along the shank section 12 in order to space the saw blade 26 the same distance from the axial face 56 of the shoulder defined by member 40. Thereafter, the tool 10 is positioned as viewed in FIG. 1 of the drawings and a suitable source of rotary input torque such as a portable drill or the like may be operatively coupled to the shank section 12 through the utilization of the coupling structure 16. Then, the handle 44 is gripped to position the tool 10 in the manner illustrated in FIG. 1 with the end 54 of the pipe section 52 abutted against the axial face 56 of the member 40. Thereafter, the rotary torque input structure coupled to the shaft section 12 may be actuated and the two hands of the operator may be utilized to guide the intermediate portion of the shank section 12 about the pipe end 54 with the radial outer face of the roller 42 engaging the outer surface of the pipe section 52 and the axial face 56 of the member 40 engaging the end face 54 of the pipe section 52. Of course, during operation of the tool 10, the saw blade 26 is engaged with and performs a cutting action on the pipe section 52.

Figure 2:
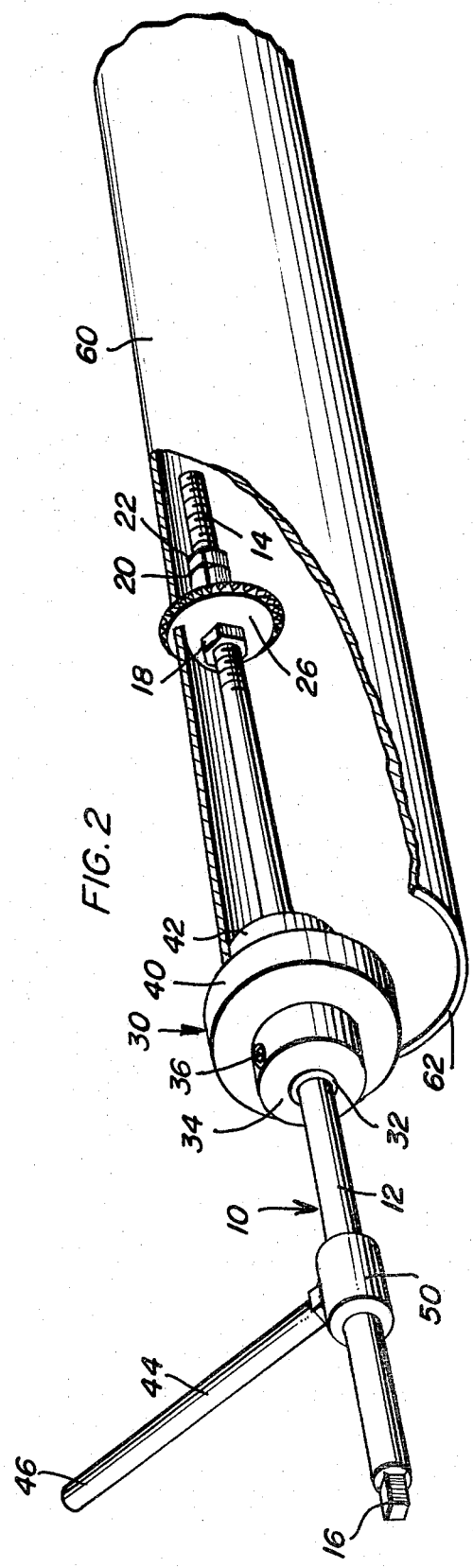
FIG. 2 is a fragmentary perspective view illustrating the tool in use cutting a second pipe section from the interior thereof.

With attention now invited more specifically to FIG. 2 of the drawings, a second pipe section 60 is to be cut from the interior thereof is illustrated and the use of the tool 10 in cutting the pipe section 60 from the interior thereof is substantially identical to the manner in which the tool 10 is used in FIG. 1, except that the tool 10 is inserted into the interior of the pipe section 60. Of course, the radial outermost face of the roller 42 engages the inner periphery of the pipe section 60 at the end 62 thereof and the axial face 56 of the member 40 engages the end edge 62 of the pipe section 60.

Further, the washers 24 may be provided in sets of varying diameters and used as abutments to limit the depth of cut effected by blade 26. This is useful when it is desired to cut the end of a PVC pipe section (or the like) from within a female component in which the pipe section end is partially bonded.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A tool for cutting predetermined length sections from pipes and the like from either the inside or the outside of the pipe being cut, said tool including an elongated shank section, mounting means on one end of said shank section, coupling means on the other end of said shank section for removably coupling a source of rotary input torque to said shank section, a rotary abutment collar assembly mounted on an intermediate portion of said shank section for rotation of said shank section relative thereto and including means operative to adjustably position said collar assembly along said shank section and to releasably retain said rotary abutment collar assembly in adjusted position on said shank section against axial displacement therealong, a circular rotary saw blade, said mounting means mounting said saw blade on said one end of said shank section concentric with said shank section and with said mounting means drivingly connecting said shank section to said rotary saw blade and supporting the latter on said shank section against axial displacement relative thereto, said abutment collar assembly including means defining a reduced diameter cylindrical projection on the axial end of said collar assembly opposing said blade with said cylindrical projection concentric with said shank section and the portions of said axial end of said collar assembly disposed radially outwardly of said projection defining a shoulder facing toward said mounting means, the diameter of said cylindrical projection being less than the diameter of said saw blade.

2. The combination of claim 1 including an elongated handle, one end of said handle defining a hand grip and the other end of said handle defining a journal portion extending transversely of said handle and through which said shank section is rotatably received, said journal portion being mounted on said shank section intermediate said abutment collar assembly and said coupling means, said journal portion also slidably receiving said shank portion therethrough.

3. The combination of claim 2 wherein said transverse journal portion is removably supported from said other end of said handle.

* * * * *